April 27, 1926.
H. E. STRATFORD
AUTOMOBILE WHEEL RIM
Original Filed Feb. 8, 1922
1,582,439
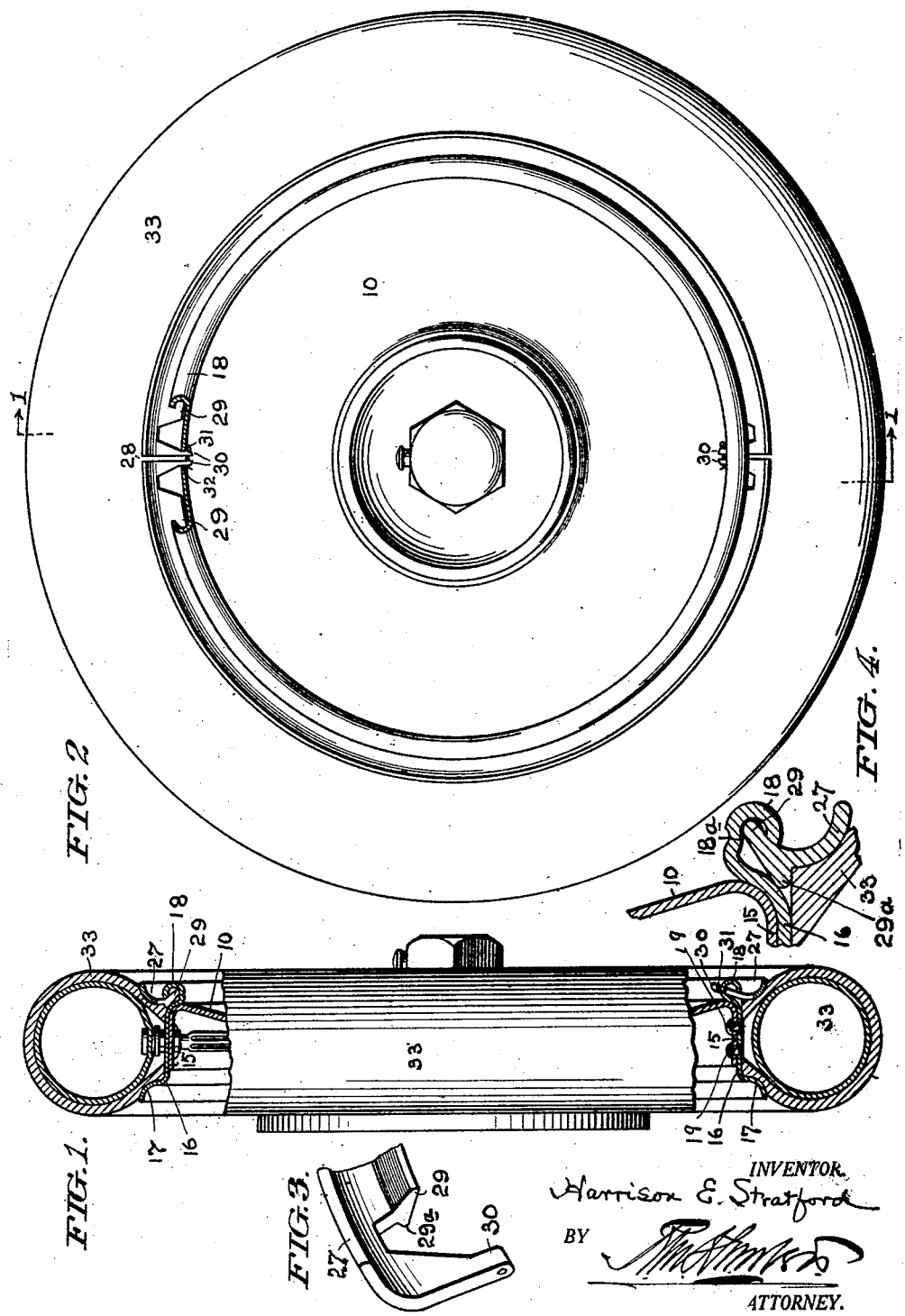
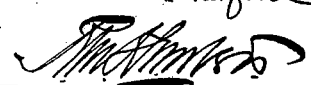

Patented Apr. 27, 1926.

1,582,439

UNITED STATES PATENT OFFICE.

HARRISON E. STRATFORD, OF PHILADELPHIA, PENNSYLVANIA.

AUTOMOBILE WHEEL RIM.

Original application filed February 8, 1922, Serial No. 534,870. Divided and this application filed October 14, 1922. Serial No. 594,442.

*To all whom it may concern:*

Be it known that I, HARRISON E. STRATFORD, a citizen of the United States, and resident of Philadelphia, county of Philadelphia, State of Pennsylvania, have invented an Improvement in Automobile Wheel Rims, of which the following is a specification.

This invention has reference to automobile wheels and more particularly to the means for securing the tires upon the wheel rims; and the present application is a division of my application Serial No. 534,870, filed February 8, 1922.

With the above and other objects in view, the nature of which will be more fully understood from the description hereinafter, my invention consists in the novel construction of automobile wheel, as hereinafter more fully described and defined in the claims.

Referring to the drawings: Fig. 1 is an edge view, partly in transverse section, of a wheel embodying my improvements; Fig. 2 is a side elevation of the same with part in section; Fig. 3 is a perspective view of one end of one of the retaining ring sections; and Fig. 4 is an enlarged sectional view of a portion of Fig. 2, showing more fully the construction of the tire retaining ring.

The hub and disk body of the wheel may be of any suitable construction. The outer portion of the disk body 10 of the wheel is bent into a flange 15 to which the metal rim 16 is riveted. It is manifest that this rim may be secured to a wooden felly or other wheel structure, but in adapting the rim for use with a pneumatic tire, I provide the following construction:

Fitted upon the flange 15 is an annular rim portion 16 which may be secured in position by means of rivets 19, or in some other convenient manner. One side of this rim is provided with an outwardly curved flange 17, and the other side is curved inward and around, as at 18, to form an annular groove. The inward curvature of this part of the rim fits to the outward curvature of the annular portion between the disk 10 and its flange 15, so that they support each other. Adjustably fitted within the annular groove are two semi-circular parts 27, substantially meeting at 28, and together constituting the clamping ring for holding the shoe 33 of the tire in position. As shown in Fig. 4, the toes 29 of these parts 27 extend into the groove and rest between the supporting edge or contact surface of the curved part 18 and the annular rib portion $18^a$ in the bottom of the groove, whereas the heel $29^a$ rests against the curved portion of the rim immediately adjacent to the shoe structure 33 and extends slightly under said shoe structure. These semi-circular parts 27 have their ends notched and provided with extending fingers 30 which project through a slot 32 formed through the bottom of the annular groove in alinement with the rib portion $18^a$, and said finger portions may be locked in position by means of a cotter pin 31 or by some other convenient means, if desired. By springing the ring portion 27 the finger portions 30 thereof may be entered into the rim slots 32, and at the same time the semi-circular ring portions 27 may then be inserted in the annular groove of the rim, and pressed up in position against the tire shoe after the same has been positioned on the rim, as shown in Fig. 1, but before the inner tube has been inflated. As soon as the inner tube is inflated, the shoe 33 presses upon the outwardly extending flange of the semi-circular ring portions 27 and upon the heel portion $29^a$, with the result that the toe portion 29 engages the rib $18^a$ on one side while the edge of the annular curved portion 18 receives the pressure of the semi-circular ring portion 27 at a point sufficiently distant from the toe portion to limit the outward movement of the curved portion 27 at the time the shoe 33 presses sufficiently upon the heel $29^a$ to hold it down in position, so that the toe cannot slip back of the rib $18^a$. In this manner, the tire is firmly clamped in position between the flanges 17 and 27, and the expansion of the tire firmly binds the latter rigidly in position, as indicated in Fig. 4, and at the same time holds it, by pressure upon the heel, against any outward tendency. It will be observed that the shoe at one side fits tightly against the flange 17 and fits the rim 16 right up to the said flange, but at the other side the shoe extends beyond the surface of the rim and is partly supported by the heel $29^a$ of the parts 27 of the ring structure.

To remove the tire, the inner tube is deflated and the cotter pins 31, the use of which may be optional, are removed, and the semi-circular ring pieces 27 are then easily released, and by slightly collapsing the shoe, may be removed; thereupon the tire may be shifted from the rim in the usual manner.

It will now be apparent that I have devised a novel and useful construction and I do not restrict myself to the minor details, as the same are susceptible of modification in various particulars without departing from the spirit or scope of the invention.

Having now described my invention, what I claim as new and desire to secure by Letters Patent is:—

1. In a wheel, a rim member mounted thereon for the purpose of attaching a tire and having at one side a flange for supporting one side of the tire and at the other side an annular grooved portion whose outer edge forms an annular contact surface and the inner wall at the bottom of the grooved portion provided with an annular shoulder which extends radially outward around the rim combined with a detachable clamping ring split radially into a plurality of curved parts each of which has a toe portion fitting down into the circumferential groove between the annular shoulder and annular contact surface formed as part of said annular grooved portion of the rim, said curved ring parts receiving the outward pressure of the tire and by reason of which pressure they retain their locking engagement with the annular shoulder and contact surface.

2. The invention according to claim 1, wherein further, the grooved portion of the rim is perforated at intervals, and the plurality of curved parts of the detachable clamping ring are provided at each of their ends with inwardly extending fingers projecting through the perforated grooved portion of the rim and directly connected together by suitable means extending through and connecting the adjacent fingers together in pairs independently of the rim.

3. The invention according to claim 1, wherein further, the grooved portion of the rim has its surface which extends outward toward the circumferential surface for the tire shaped to provide an inclined annular surface, and the circumferentially curved parts of the detachable clamping ring have their toe portions arranged on the outer side of the part which supports the tire, said ring parts also provided with heel portions on the inner side of the tire supporting part, said heel portions resting against the annular curved inclined rim surface and also forming a seat circumferentially in line with the supporting surface of the rim and upon which the tire directly seats, the construction being such that the action of the tire presses the ring parts upon the annular curved inclined rim surfaces and causes their toe portions to be forced forcibly into the annular grooved portions of the rim for locking them more firmly therein.

In testimony of which invention, I hereunto set my hand.

HARRISON E. STRATFORD.